Dec. 17, 1968  AISABURO YAGISHITA  3,417,016
ION EXCHANGE PROCESS FOR TREATMENT OF INDUSTRIAL WASTES
Filed Oct. 4, 1966
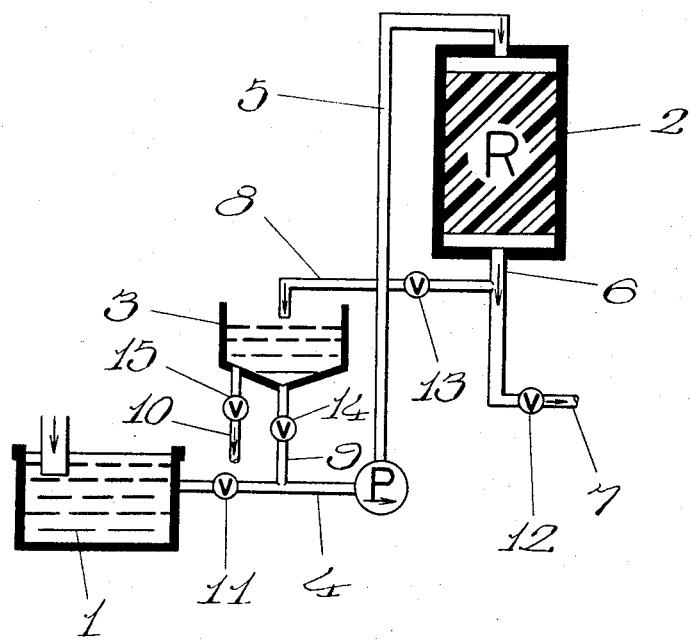
INVENTOR.
Aisaburo Yagishita
BY
Attorney

United States Patent Office 3,417,016
Patented Dec. 17, 1968

3,417,016
ION EXCHANGE PROCESS FOR TREATMENT OF INDUSTRIAL WASTES
Aisaburo Yagishita, 5-2, Shinpo-cho 4-chome, Chigusa-ku, Nagoya, Japan
Filed Oct. 4, 1966, Ser. No. 584,208
Claims priority, application Japan, Mar. 11, 1966, 41/14,605
2 Claims. (Cl. 210—34)

ABSTRACT OF THE DISCLOSURE

For treating industrial wastes containing chromic acid, the wastes are passed through an ion exchange resin until the resin becomes so saturated with chromic acid as no longer to be efficient. Then supply of the wastes to the resin is shut off, and the wastes, after passage through the resin, are discharged into a tank into which is also charged a reducing agent, such as sodium bisulfite, and the mixture of reducing agent and discharge is circulated through the resin and back to the tank to regenerate the resin and convert the chromic acid into a harmless trivalent chromium ion. The process of treating the wastes may be resumed after proper regeneration of the resin.

---

This invention relates to the treatment of industrial wastes containing chromic acid by means of ion exchange resins.

More particularly, it relates to a novel and improved method for the treatment of industrial wastes containing chromic acid by means of ion exchange resins.

For the purpose of treating such industrial wastes, there has been most widely practiced a method which comprises the steps of adjusting the pH of industrial wastes to a pH of below about 2 by addition of a suitable mineral acid, adding a suitable reducing agent to the acidified liquid thus obtained, thereby converting chromic acid into the corresponding salt such as chromium sulfate which is easily precipitable by neutralization, neutralizing the liquid with a suitable alkali, thereby precipitating said salt and then separating the precipitate from the liquid.

However, this prior method has serious disadvantages; for instance, it is inapplicable to medium and small plating plants, since the method needs to apply a large amount of mineral acid for its acid for its acidification step and reducing agents for its reduction step in proportion to the volume of wastes to be treated; and also it requires a large area for the equipment.

As another method though which is theoretically possible but practically infeasible, there has been proposed an ion exchange method which comprises treating industrial wastes containing chromic acid with ion exchange resins. This ion exchange method, more particularly, comprises passing the wastes containing chromic acid through anion exchange resin layers. Thereby the chromic acid in the wastes is adsorbed on said resin layers as illustrated in the following reaction scheme (I) and the harmless wastes thus obtained are discharged:

$$R(-OH_2) + H_2CrO_4 \rightarrow R-CrO_4 + 2H_2O \quad (I)$$

wherein R represents an anion exchange resin base.

In the aforementioned ion exchange method, where the anion exchange resin used is completely saturated with chromic acid, a 5-10% sodium hydroxide or sodium chloride solution is then passed through the said resin layer in an amount of 3–5 l. per one litre of the resin so that the regeneration of the saturated ion exchange resin may be effected according to the following reaction scheme (II):

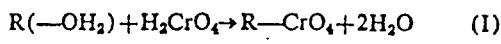

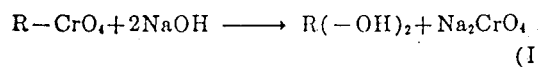

(II)

The problem in the above prior method is the amount of the regenerating agent, such as sodium hydroxide, required for the purpose of regenerating the said saturated ion exchange resin. Since the regenerating agent, such as sodium hydroxide, must be employed in a greater excess amount than that required theoretically in the above mentioned reaction scheme (II) and the chromic acid is discharged in the form of sodium chromate dissolved in a 4–6% sodium hydroxide solution, it is required that the treated waste be collected in a separate vessel. The waste so collected is neutralized by addition of a large amount of a suitable mineral acid. The pH of the neutralized liquid is adjusted to below pH; and the sodium chromate therein is converted into chromium sulfate by further addition of a suitable reducing agent.

As pointed out hereinabove, the conventional methods for treatment of wastes by means of ion exchange resins are accompanied with a number of disadvantages such as the requirements for complicated and skillful procedures, regeneration of the ion exchange resin and reduction of the chromic acid which have to be effected separately, and the requirement for sodium hydroxide and acid in several times the amounts actually required for treating chromic acid, and the indispensable discharge of such materials with the treated waste.

Accordingly, it has been considered feasible only on a laboratory scale and impracticable for industrial purposes, to employ ion exchange resins for the treatment of industrial wastes containing chromic acid in order to make them harmless.

As a result of my studies based upon the fact that an anion exchange resin does not adsorb or ion-exchange the cation contained in a solution with which the resin is contacted, it has now been found by me that the chromic acid, which is in the form of chromate ion or dichromate ion in wastes both being present as anions, can be adsorbed on an anion exchange resin, and that in the regeneration of the anion exchange resin, which has adsorbed chromic acid on it, a suitable reducing agent and regenerating agent, can directly be contacted with the said exhausted anion exchange resin so that the adsorbed chromate ions may be converted into the corresponding trivalent chromium ion (cation; $Cr^{+3}$). Thereby the desorption of the said chromate ions into the solution and simultaneous regeneration of the said exhausted anion exchanged resin are accomplished.

The principal object of this invention is to provide a novel method for the treatment of industrial wastes, containing chromic acid, by means of anion exchange resins, which can be practiced economically and effectively.

A further object of this invention is to provide a novel method for the treatment of industrial wastes containing chromic acid by means of anion exchange resins, which can achieve simultaneously the regeneration of exhausted anion exchange resins.

Other objects will become apparent to those skilled in the art from the following detailed description of this invention.

The method of this invention will be more fully illustrated with reference to the accompanying drawing, which is a diagrammatic view of one embodiment of this invention.

As shown in the drawing, industrial wastes containing chromic acid are stored in a reservoir 1, in which various solid substances are settled and separated off from the wastes. The wastes are then pumped to an anion exchange column 2 through an inlet pipe 4 and outlet pipe 5 by means of a pump P. In said column 2 is charged an anion exchange resin R in a layer. On passing through the said anion exchange resin layer, the chromic acid existing in the wastes is adsorbed on the resin R and then including lower costs of the chemicals employed and very simple procedures and equipment so that the present method may be far more easily and economically

TABLE

| Date of operation | The present method | | The prior method | | | |
|---|---|---|---|---|---|---|
| | Chromic acid content of the treated waste (mg./l.) | Chemicals employed—Sodium bisulfite (kg./day) | Chromic acid content of the treated waste (mg./l.) | Chemicals employed | | |
| | | | | Sodium bisulfite (kg./day) | Sodium hydroxide (kg./day) | Sulfuric acid (kg./day) |
| Dec. 25 | 0.2 | 3 | 0.2 | 4 | 8 | 9.5 |
| Dec. 26 | 0.1 | 3 | 0.2 | 4 | 8 | 10.0 |
| Dec. 27 | 0.01 | 2.5 | 0.01 | 4 | 8 | 9.5 |
| Dec. 28 | 0.2 | 2.5 | 0.1 | 4 | 8 | 9.5 |
| Jan. 7 | 0.3 | 3.0 | 0.2 | 4 | 8 | 9.5 |
| Jan. 8 | 0.1 | 3.0 | 0.5 | 4 | 8 | 9.5 |
| Jan. 9 | 0.3 | 3.0 | 0.2 | 4 | 8 | 9.5 |
| Jan. 10 | 0.2 | 3.0 | 0.3 | 4 | 8 | 9.5 |
| Jan. 11 | 0.1 | 3.0 | 0.1 | 4 | 8 | 9.5 |
| Jan. 12 | 0.1 | 3.0 | 0.1 | 4 | 8 | 9.5 |
| Total amount of chemicals (kg.) | | 29 | | 40 | 80 | 95.5 |
| Cost of chemicals* | | $5.35 | | $7.77 | $8.88 | $2.65 |
| Total cost of chemicals* | $5.35 | | $19.30 | | | |

*The unit cost of the chemicals employed is based upon the following standard, respectively:
Sodium bisulfite $/kg ............ 0.19
Sodium hydroxide, $/kg ............ 0.11
Sulfuric acid, $/kg ............ 0.02 the wastes which become harmless are discharged out from discharge pipe 7 by outlet pipe 6. When it is found by the detection of chromic acid in the discharged wastes that the resin R has become saturated with chromic acid, valves 11 and 12 are closed and valves 13 and 14 are opened so that the waste remaining in the column 2 is supplied, via a regeneration pipe 8 branched from the outlet pipe 6, to chemical tank 3. The tank 3 is connected to the pump P by a pipe 9 branched from the inlet pipe 4. Thus, the waste is circulated through the ion exchange column 2 and chemical tank 3. During the course of the aforesaid operation, a reducing agent such as sodium bisulfite is charged into the chemical tank 3 in an amount required for reducing the chromic acid adsorbed on the said resin and the circulation of the waste is continued for about 10 minutes, whereby the reducing agent contacts with the exhausted anion exchange resin in the said column 2 and the chromic acid is reduced to trivalent chromium ion, and released from ion exchange resin into the circulating waste in a bluish purple color, while the resin is regenerated.

The whole waste in the said column 2 is then transferred into the chemical tank 3 by stopping the pump P and closing valve 14. By closing valve 13, opening valves 11 and 12, and starting pump P treatment of the waste, containing chromic acid, in the reservoir 1 by the ion exchange resin in the column 2 is restarted and the harmless waste is discharged from the discharge pipe 7.

The bluish purple-colored waste stored in the chemical tank 3 comprises harmless trivalent chromium ion produced by reduction of chromic acid and is optionally and portionwise discharged from a drain pipe 10 by opening a valve 15 provided in the pipe 10.

As examples of the method according to this invention, the wastes which were discarded from a chromium plating plant, having a capacity of discharging hourly 12 m.³ of wastes containing chromic acid at an average concentration of 40 mg. per one litre thereof, were treated. The operation was conducted daily for 10 hours with a treating amount of 5 m.³/hour by employing 50 l. of an anion exchange resin. The concentration of chromic acid in the discharging waste and the amounts and costs of the chemicals required for treatment were determined, as compared with those of, as a control, the aforementioned prior ion exchange method. The results are given in the following table.

From the table, it will be apparent to those skilled in the art that the present method is a novel and improved method for treatment of the harmful industrial waste, which method has various advantages, especially, employed in medium and small chromium plating plants for the purpose of public health, and thus provide useful preventive means for treatment of publicly harmful industrial wastes containing chromic acid.

What is claimed is:
1. The process of treating industrial wastes containing chromic acid, which comprises
passing the wastes through an anion exchange resin, discharging, for use, the wastes so treated until the resin has become so saturated with chromic acid as no longer to be efficient,
then stopping such discharge and shutting off supply of wastes to the resin and discharging the wastes in the resin, after passage through the resin, into a container, introducing a reducing agent into the container,
and circulating the last-described discharge and reducing agent through the exchange resin and back into the container again,
while continuing to charge the reducing agent into the container and
continuing the circulation of the mixed wastes and reducing agent to regenerate the resin and to reduce the chromic acid, which was previously adsorbed in the resin, and that in the circulating system to trivalent chromic acid,
then removing all the mixed waste and reducing agent from the system.
2. A process as claimed in claim 1, in which the reducing agent is sodium bisulfite.

References Cited

UNITED STATES PATENTS 3,223,620 12/1965 Oberhofer ............ 210—30
3,306,859 2/1967 Sloan et al. ............ 210—30 X

OTHER REFERENCES

Bloodgood et al.: Peculiar Characteristics of Chromium; Fifth Industrial Waste Conference; Purdue University, Lafayette, Indiana; 1949, pps. 232–233 and 240–241 relied on.

Kunin, Robert: Ion Exchange Resins; John Wiley & Sons; New York, N.Y.; 1958, p. 204 relied on.

REUBEN FRIEDMAN, *Primary Examiner.*

C. M. DITLOW, *Assistant Examiner.*

U.S. Cl. X.R.

210—37